United States Patent
Taras et al.

(10) Patent No.: US 10,767,937 B2
(45) Date of Patent: Sep. 8, 2020

(54) FLATTENED TUBE FINNED HEAT EXCHANGER AND FABRICATION METHOD

(71) Applicants: Michael F. Taras, Fayetteville, NY (US); Arindom Joardar, East Syracuse, NY (US); Luis F. Avila, Manlius, NY (US); Bruce J. Poplawski, Mattydale, NY (US); Jack L. Esformes, Jamesville, NY (US); Melkamu Woldesemayat, Liverpool, NY (US)

(72) Inventors: Michael F. Taras, Fayetteville, NY (US); Arindom Joardar, East Syracuse, NY (US); Luis F. Avila, Manlius, NY (US); Bruce J. Poplawski, Mattydale, NY (US); Jack L. Esformes, Jamesville, NY (US); Melkamu Woldesemayat, Liverpool, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 956 days.

(21) Appl. No.: 14/352,362

(22) PCT Filed: Sep. 27, 2012

(86) PCT No.: PCT/US2012/057460
§ 371 (c)(1),
(2) Date: Apr. 17, 2014

(87) PCT Pub. No.: WO2013/058953
PCT Pub. Date: Apr. 25, 2013

(65) Prior Publication Data
US 2014/0262181 A1    Sep. 18, 2014

Related U.S. Application Data

(60) Provisional application No. 61/548,864, filed on Oct. 19, 2011.

(51) Int. Cl.
*F28F 1/10*      (2006.01)
*F28D 1/053*     (2006.01)
(Continued)

(52) U.S. Cl.
CPC .............. *F28F 1/10* (2013.01); *B23P 15/26* (2013.01); *F28D 1/05383* (2013.01);
(Continued)

(58) Field of Classification Search
CPC ....... F28F 1/10; F28F 17/005; F28D 1/05391; F28D 1/05383; Y10T 29/4938
See application file for complete search history.

(56) References Cited

U.S. PATENT DOCUMENTS 1,899,080 A    2/1933  Dalgliesh
2,184,657 A    12/1939 Young
(Continued)

FOREIGN PATENT DOCUMENTS

CN    201173710 Y    12/2008
CN    201621986 U    11/2010
(Continued)

OTHER PUBLICATIONS

Chinese First Office Action for application CN 201280050975.4, dated Jul. 7, 2015, 7 pages.
(Continued)

*Primary Examiner* — Gordon A Jones
(74) *Attorney, Agent, or Firm* — Cantor Colburn LLP

(57) ABSTRACT

A multiple tube bank heat exchanger includes a first tube bank including at least a first and a second flattened tube segments extending longitudinally in spaced parallel relationship and a second tube bank including at least a first and a second flattened tube segments extending longitudinally in spaced parallel relationship. The second tube bank is disposed behind the first tube bank with a leading edge of the second tube bank spaced from a trailing edge of the first tube bank. A continuous folded fin extends between the first and second flattened tube segments of both of said first tube bank and said second tube bank.

12 Claims, 7 Drawing Sheets

(51) Int. Cl.
*F28F 17/00* (2006.01)
*B23P 15/26* (2006.01)

(52) U.S. Cl.
CPC ........ *F28D 1/05391* (2013.01); *F28F 17/005* (2013.01); *B23P 2700/00* (2013.01); *Y10T 29/4938* (2015.01)

(56) References Cited

U.S. PATENT DOCUMENTS

| | | | |
|---|---|---|---|
| 3,256,930 A | 6/1966 | Norback | |
| 4,328,861 A * | 5/1982 | Cheong | F28D 1/0316 165/151 |
| 5,000,257 A | 3/1991 | Shinmura | |
| 5,033,540 A | 7/1991 | Tategami et al. | |
| 5,086,835 A | 2/1992 | Shinmura | |
| 5,111,878 A | 5/1992 | Kadle | |
| 5,125,453 A | 6/1992 | Bertrand et al. | |
| 5,190,101 A | 3/1993 | Jalilevand et al. | |
| 5,205,347 A | 4/1993 | Hughes | |
| 5,348,081 A | 9/1994 | Halstead et al. | |
| 5,358,034 A | 10/1994 | Nishishita et al. | |
| 5,448,899 A | 9/1995 | Ohara et al. | |
| 5,509,199 A | 4/1996 | Beamer et al. | |
| 5,511,611 A | 4/1996 | Nishishita | |
| 5,531,268 A | 7/1996 | Hoshino et al. | |
| 5,662,164 A | 9/1997 | Nishishita | |
| 5,701,760 A | 12/1997 | Torigoe et al. | |
| 5,735,343 A | 4/1998 | Kajikawa et al. | |
| 5,881,804 A | 3/1999 | Nishishita et al. | |
| 5,918,664 A | 7/1999 | Torigoe | |
| 5,931,020 A | 8/1999 | Nakamura | |
| 5,979,547 A | 11/1999 | Shinmura et al. | |
| 6,000,460 A | 12/1999 | Yamanaka et al. | |
| 6,095,239 A * | 8/2000 | Makino | F28D 1/0435 165/135 |
| 6,145,587 A | 11/2000 | Hanafusa | |
| 6,161,616 A | 12/2000 | Haussmann | |
| 6,189,603 B1 * | 2/2001 | Sugimoto | F28D 1/0435 165/135 |
| 6,189,604 B1 * | 2/2001 | Yamauchi | B60H 1/00328 165/140 |
| 6,199,401 B1 | 3/2001 | Haussmann et al. | |
| 6,209,628 B1 * | 4/2001 | Sugimoto | F28D 1/0435 165/135 |
| 6,213,196 B1 | 4/2001 | Ozaki et al. | |
| 6,230,787 B1 | 5/2001 | Koga et al. | |
| 6,230,793 B1 | 5/2001 | Sumida | |
| 6,272,881 B1 | 8/2001 | Kuroyanagi et al. | |
| 6,276,443 B1 | 8/2001 | Martin, Sr. | |
| 6,305,465 B1 * | 10/2001 | Uchikawa | F28D 1/0435 165/135 |
| 6,354,369 B1 * | 3/2002 | Kuboyama | A23N 12/08 165/110 |
| 6,357,519 B1 | 3/2002 | Ozaki et al. | |
| 6,397,938 B1 | 6/2002 | Nishishita et al. | |
| 6,401,804 B1 | 6/2002 | Shimoya et al. | |
| 6,408,939 B1 | 6/2002 | Sugimoto et al. | |
| 6,431,264 B2 | 8/2002 | Tooyama et al. | |
| 6,516,486 B1 | 2/2003 | Mehendale et al. | |
| 6,530,423 B2 | 3/2003 | Nakado et al. | |
| 6,536,517 B2 | 3/2003 | Hoshino et al. | |
| 6,543,528 B2 | 4/2003 | Saito et al. | |
| 6,561,264 B2 | 5/2003 | Ozaki et al. | |
| 6,698,509 B2 | 3/2004 | Rong | |
| 6,705,387 B2 | 3/2004 | Kokubunji et al. | |
| 6,742,577 B2 | 6/2004 | Joboji et al. | |
| 6,745,827 B2 * | 6/2004 | Lee | F25B 39/02 165/144 |
| 6,789,613 B1 | 9/2004 | Ozaki et al. | |
| 6,814,135 B2 | 11/2004 | Narahara | |
| 6,814,136 B2 | 11/2004 | Yi et al. | |
| 6,823,933 B2 | 11/2004 | Chiba | |
| 6,854,286 B2 | 2/2005 | Bureau et al. | |
| 6,871,399 B2 | 3/2005 | Iwasaki et al. | |
| 6,889,757 B2 * | 5/2005 | Iwasaki | F28D 1/0435 165/135 |
| 6,899,167 B2 | 5/2005 | Martins et al. | |
| 6,920,916 B2 | 7/2005 | Higashiyama | |
| 6,964,296 B2 | 11/2005 | Memory et al. | |
| 7,013,952 B2 | 3/2006 | Park et al. | |
| 7,021,371 B2 | 4/2006 | Saito | |
| 7,040,385 B2 | 5/2006 | Higashiyama | |
| 7,066,243 B2 | 6/2006 | Horiuchi et al. | |
| 7,107,787 B2 | 9/2006 | Inaba | |
| 7,111,669 B2 | 9/2006 | Hoeglinger et al. | |
| 7,178,585 B1 | 2/2007 | Mehendale et al. | |
| 7,219,511 B2 | 5/2007 | Inaba et al. | |
| 7,222,501 B2 | 5/2007 | Cho et al. | |
| 7,246,438 B2 | 7/2007 | Nozaki | |
| 7,254,961 B2 | 8/2007 | Oshitani et al. | |
| 7,267,159 B2 | 9/2007 | Iwasaki et al. | |
| 7,303,004 B2 | 12/2007 | Iwasa | |
| 7,322,399 B2 | 1/2008 | Guerrero | |
| 7,398,820 B2 | 7/2008 | Inaba | |
| 7,448,436 B2 | 11/2008 | Katoh et al. | |
| 7,490,476 B2 | 2/2009 | Max | |
| 7,523,781 B2 | 4/2009 | Oh et al. | |
| 7,635,019 B2 | 12/2009 | Higashiyama | |
| 7,640,970 B2 | 1/2010 | Kim et al. | |
| 7,647,789 B2 | 1/2010 | Aung et al. | |
| 7,650,934 B2 | 1/2010 | Demuth et al. | |
| 7,654,108 B2 | 2/2010 | Ishizaka et al. | |
| 7,673,670 B2 | 3/2010 | Higashiyama | |
| 7,708,054 B2 | 5/2010 | Watanabe et al. | |
| 7,726,387 B2 | 6/2010 | Higashiyama | |
| 7,757,753 B2 | 7/2010 | Yanik et al. | |
| 7,784,529 B2 | 8/2010 | Higashiyama | |
| 7,793,710 B2 | 9/2010 | Lamich et al. | |
| 7,832,229 B2 | 11/2010 | Nakamura et al. | |
| 7,878,234 B2 | 2/2011 | Lim et al. | |
| 7,886,811 B2 | 2/2011 | Higashiyama | |
| 7,886,812 B2 | 2/2011 | Higashiyama | |
| 7,918,266 B2 | 4/2011 | Arino et al. | |
| 7,934,541 B2 | 5/2011 | Park et al. | |
| 7,942,020 B2 | 5/2011 | Knight et al. | |
| 7,971,631 B2 | 7/2011 | Alcaine et al. | |
| 2003/0041610 A1 | 3/2003 | Shirota et al. | |
| 2003/0221819 A1 | 12/2003 | Jang | |
| 2004/0159121 A1 | 8/2004 | Horiuchi et al. | |
| 2004/0211551 A1 | 10/2004 | Shinmura et al. | |
| 2005/0039895 A1 | 2/2005 | Inaba et al. | |
| 2006/0054310 A1 * | 3/2006 | Kim | F25B 39/02 165/110 |
| 2006/0054312 A1 | 3/2006 | Kim et al. | |
| 2006/0130517 A1 | 6/2006 | Merkys et al. | |
| 2006/0201198 A1 | 9/2006 | Nishino et al. | |
| 2007/0163294 A1 | 7/2007 | Aung et al. | |
| 2008/0011463 A1 | 1/2008 | Timbs et al. | |
| 2009/0025914 A1 | 1/2009 | Knight et al. | |
| 2009/0090130 A1 | 4/2009 | Aung et al. | |
| 2009/0158772 A1 | 6/2009 | Kawamata | |
| 2010/0031698 A1 | 2/2010 | Higashiyama | |
| 2010/0122544 A1 | 5/2010 | Yang et al. | |
| 2010/0181058 A1 | 7/2010 | Huazhao et al. | |
| 2010/0313587 A1 | 12/2010 | Wolfe, IV et al. | |
| 2011/0094257 A1 | 4/2011 | Rusignuolo et al. | |
| 2011/0113803 A1 | 5/2011 | Ahn et al. | |
| 2011/0154855 A1 | 6/2011 | Sasaki et al. | |

FOREIGN PATENT DOCUMENTS

| | | |
|---|---|---|
| JP | S6246195 A | 2/1987 |
| JP | H02106697 A | 4/1990 |
| JP | H03164689 A | 7/1991 |
| JP | H03221789 A | 9/1991 |
| JP | H03279762 A | 12/1991 |
| JP | H0432697 A | 2/1992 |
| JP | 2006170601 A | 6/2006 |
| JP | 2009079781 A | 4/2009 |
| KR | 20070072213 A | 7/2007 |
| WO | 2006004137 A1 | 1/2006 |
| WO | 2007037670 A1 | 4/2007 |

(56) References Cited

FOREIGN PATENT DOCUMENTS

| WO | WO 2007/037670 A1 * | 4/2007 | ............... F28F 9/26 |
|----|---------------------|--------|---------------------------|
| WO | 2007129851 A1 | 11/2007 | |
| WO | 2011049015 A1 | 4/2011 | |

OTHER PUBLICATIONS

PCT International Search Report and Written Opinion of the International Searching Authority for International Application No. PCT/US2012/057460, dated Mar. 21, 2013, 7 pages.

PCT International Preliminary Report on Patentability and Written Opinion of the International Searching Authority for Internation Application No. PCT/US2012/057460, dated May 1, 2014, 10 pages.

\* cited by examiner

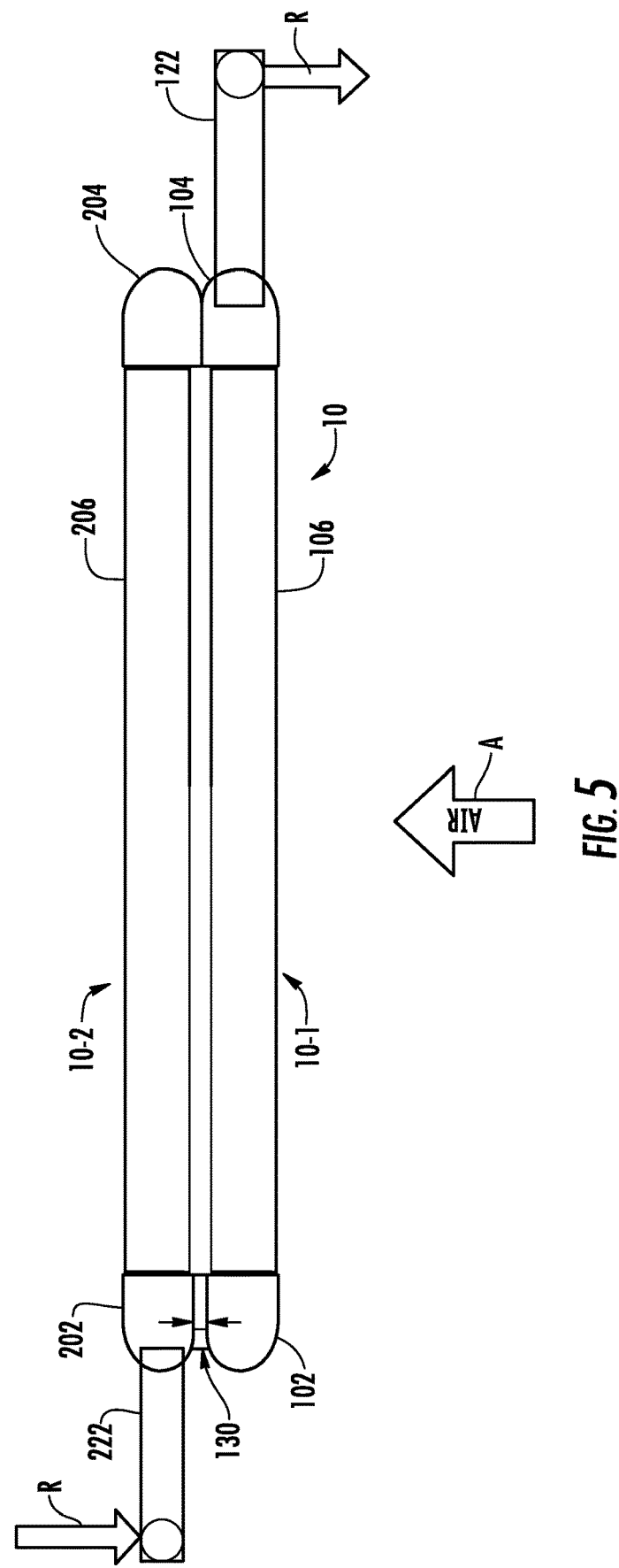

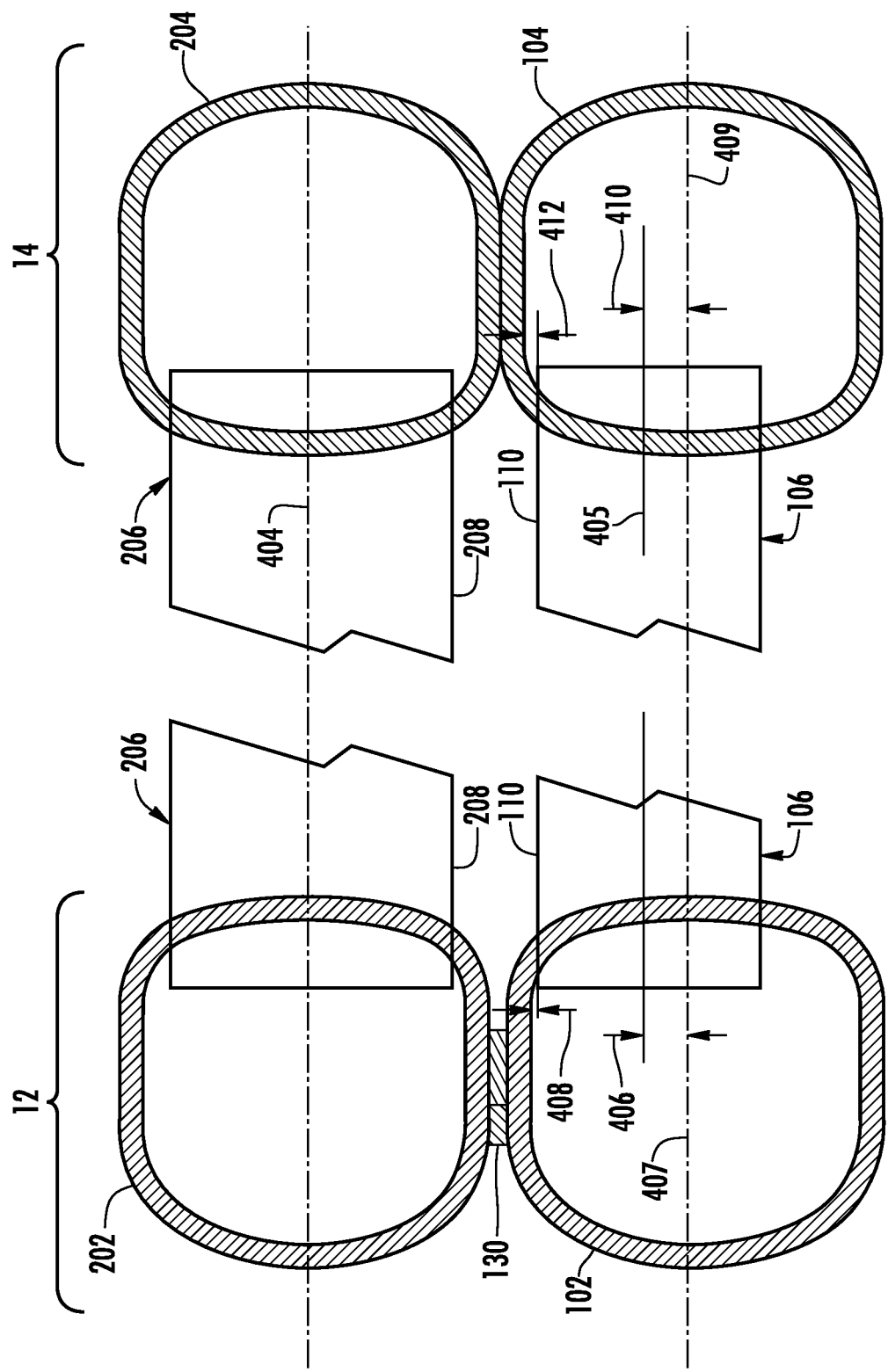

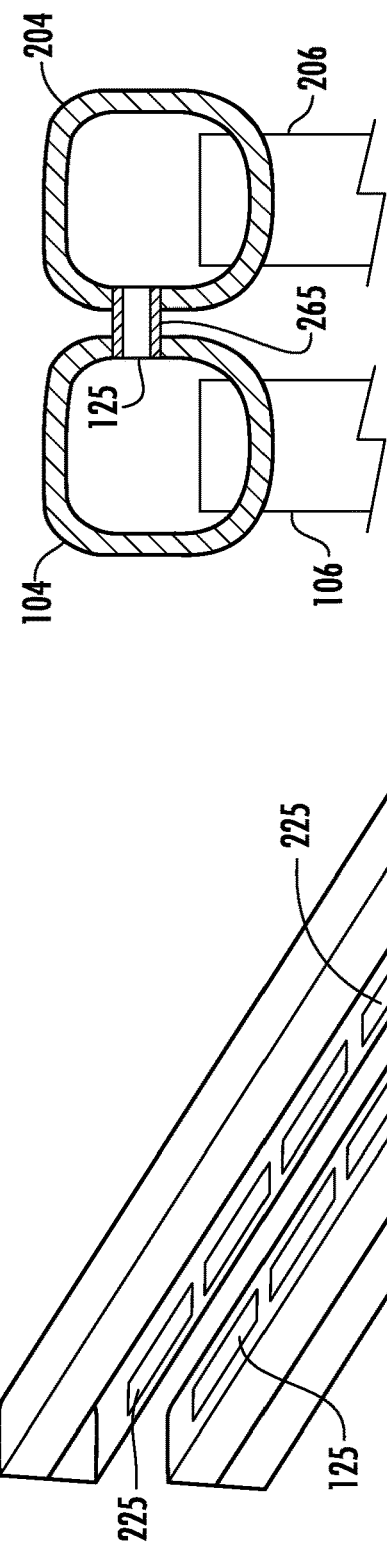
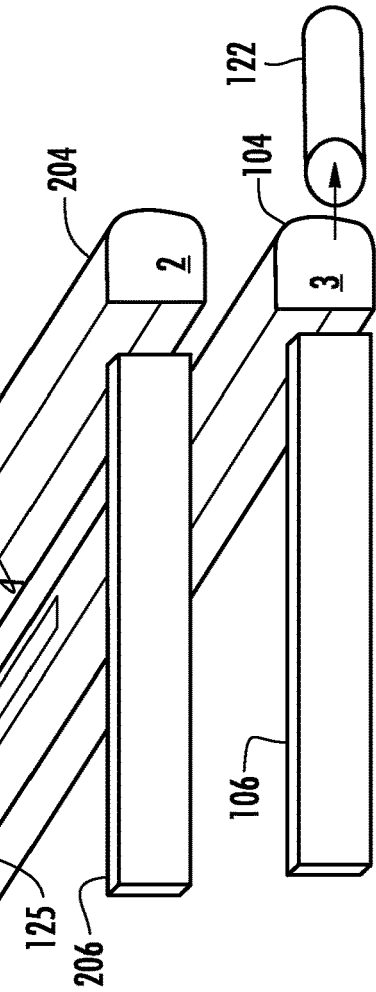
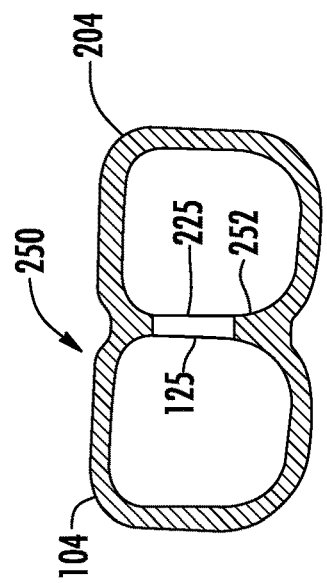
FIG. 11A
FIG. 8
FIG. 9

FLATTENED TUBE FINNED HEAT EXCHANGER AND FABRICATION METHOD

CROSS-REFERENCE TO RELATED APPLICATION

Reference is made to and this application claims priority from and the benefit of U.S. Provisional Application Ser. No. 61/548,864, filed Oct. 19, 2011, and entitled FLATTENED TUBE FINNED HEAT EXCHANGER AND FABRICATION METHOD, which application is incorporated herein in its entirety by reference.

FIELD OF THE INVENTION

This invention relates generally to heat exchangers and, more particularly, to flattened tube and fin heat exchangers.

BACKGROUND OF THE INVENTION

Heat exchangers have long been used as evaporators and condensers in heating, ventilating, air conditioning and refrigeration (HVACR) applications. Historically, these heat exchangers have been round tube and plate fin (RTPF) heat exchangers. However, all aluminum flattened tube and fin heat exchangers are finding increasingly wider use in industry, including the HVACR industry, due to their compactness, thermal-hydraulic performance, structural rigidity, lower weight and reduced refrigerant charge, in comparison to conventional RTPF heat exchangers.

A typical flattened tube and fin heat exchanger includes a first manifold, a second manifold, and a single tube bank formed of a plurality of longitudinally extending flattened heat exchange tubes disposed in spaced parallel relationship and extending between the first manifold and the second manifold. The first manifold, second manifold and tube bank assembly is commonly referred to in the heat exchanger art as a slab. Additionally, a plurality of fins are disposed between each neighboring pair of heat exchange tubes for increasing heat transfer between a fluid, commonly air in HVACR applications, flowing over the outer surface of the flattened tubes and along the fin surfaces and a fluid, commonly refrigerant in HVACR applications, flowing inside the flattened tubes. Such single tube bank heat exchangers, also known as single slab heat exchangers, have a pure cross-flow configuration. In an embodiment of flattened tube commonly used in HVACR applications, the interior of the flattened tube is subdivided into a plurality of parallel flow channels. Such flattened tubes are commonly referred to in the art as multichannel tubes, mini-channel tubes or micro-channel tubes.

Double bank flattened tube and fin heat exchangers are also known in the art. Conventional double bank flattened tube and fin heat exchangers, also referred to in the heat exchanger art as double slab heat exchangers, are typically formed of two conventional fin and tube slabs, one disposed behind the other, with fluid communication between the manifolds accomplished through external piping. However, to connect the two slabs in fluid flow communication in other than a parallel cross-flow arrangement requires complex external piping. For example, U.S. Pat. No. 6,964,296 shows a flattened tube and fin heat exchanger in both a single slab and a double slab embodiment with horizontal tube runs and vertically extending fins. U.S. Patent Application Publication No. US 2009/0025914 A1 shows a double slab flatted tube and fin heat exchanger wherein each slab has vertical tube runs extending between a pair of horizontally extending manifolds and includes corrugated fins disposed between adjacent tubes.

A concern associated with the use of flattened tube heat exchangers as condensers in HVACR applications is poor drainage of retained water from the external surface of the flattened tubes and fin matrix. The retention of water can be particularly problematic in flattened tube heat exchangers having horizontal tubes with high fin density, sufficient flattened tube depth and close flattened tube spacing common in condenser applications. In such constructions, water tends to collect on the flat horizontal surfaces of the heat exchange tubes in the spaces between the densely packed fins. The water collecting on the external surfaces of the heat exchanger tubes acts as an electrolyte and tends to accelerate corrosion and pitting of the tube surface. Water retention on the horizontal surface of the heat exchanger tube may also result in increased airside pressure drop and reduced air flow which adversely affects the thermal performance of the system. Any water collecting on the horizontal tube surface also constitutes a layer of added thermal resistance to heat transfer on the airside of the heat exchange tubes.

Accordingly, the need exists for a flattened tube finned heat exchanger that is substantially free draining of retained water off the horizontal flat surface of the flattened horizontally extending heat exchange tubes. The desire also exists for a flattened tube finned heat exchanger that is substantially free draining of water, while also achieving enhanced thermal performance. The need also exists for a double slab flattened tube finned heat exchanger of simplified construction and a method for assembling the heat exchanger for high volume semi-automated production.

SUMMARY OF THE INVENTION

In an aspect, a multiple slab flattened tube finned heat exchanger is provided that offers improved drainage of retained water, particularly in condenser applications, while exhibiting enhanced thermal performance and reduced risk of failure due to thermal fatigue.

In an aspect, a heat exchanger for transferring heat between a first fluid and a second fluid includes at least a first heat exchanger slab and a second heat exchanger slab disposed in generally parallel alignment with first heat exchanger slab. Each of the first and second heat exchanger slabs includes a first manifold, a second manifold spaced from the first manifold, and a tube bank including a plurality of tube segments extending longitudinally in spaced relationship between the first manifold and the second manifold and defining a flow passage for the first fluid. The first manifold of the first heat exchanger slab and the first manifold of the second heat exchanger slab are juxtaposed in spaced relationship at a first side of the heat exchanger, and the second manifold of the second heat exchanger slab and the second manifold of the first heat exchanger slab are disposed at a second side of the heat exchanger. A spacer may be disposed between the first manifold of the first heat exchanger slab and the first manifold of the second heat exchanger slab for maintaining a desired spacing between the first manifolds.

A plurality of folded fins may be disposed in a flow path of the second fluid defined between the plurality of spaced flattened tube segments of the first and second tube banks. Each fold fin has a depth extending at least from a leading edge of the flattened tube segments of the first tube bank to a trailing edge of the tube segments of the second tube bank, the second tube bank being disposed aft of the first tube bank with respect to flow of the second fluid through the flow path of the second fluid. In an embodiment, at least one of the folded fins has a leading edge portion that overhangs the leading edge of the first tube bank.

The second heat exchanger slab may be positioned downstream with respect to flow of the second fluid of said first heat exchanger slab whereby a gap is provided between a trailing edge of the first tube bank and a leading edge of the second tube bank. In an embodiment, the tube segments f the first tube bank and the second tube bank are flattened tube segments. In an embodiment, a ratio the depth of the flattened tube segments to the depth of the gap is in the range between 1.2 and 6.0, inclusive. In an embodiment, a ratio the depth of the flattened tube segments to the depth of the gap is in the range between 1.2 and 6.0, inclusive.

In an aspect, a method is provided for adjusting a ratio of the primary heat transfer surface area collectively defined by the first and second plurality of flattened tube segments to the secondary heat transfer surface area collectively defined by the plurality of folded fin strips by increasing or decreasing a depth of the gap.

In an embodiment, the second manifold of the first heat exchanger slab has at least one flow cutout formed in a side wall thereof and the second manifold of the second heat exchanger slab has at least one flow cutout formed in a side wall thereof, and the second manifolds are disposed in side-by-side relationship with the at least one flow cutout in the second manifold of the first heat exchanger slab and the at least one flow cutout in the second manifold of the second heat exchanger slab in registration so as to define a flow passageway for the fluid to be cooled to flow from the second manifold of the second heat exchanger slab into the second manifold of the first heat exchanger slab. In another embodiment, the second manifold of the first heat exchanger slab and the second manifold of the second heat exchanger slab are formed in a single manifold structure on opposite sides of a common interface wall. The common interface wall has at least one flow cutout extending therethrough defining a flow passageway for the fluid to be cooled to flow from the second manifold of the second heat exchanger slab into the second manifold of the first heat exchanger slab.

At least one of the first heat exchanger slab and the second heat exchanger slab may include at least one of the first manifold and second manifold thereof being offset from a centerline of the respective tube bank of the first and second tube banks. In an embodiment, at least one of the first heat exchanger slab and the second heat exchanger slab includes the first manifold thereof being offset from the centerline of the respective tube bank thereof by a first offset distance and the second manifold thereof being offset from the centerline of the respective tube bank thereof by a second offset distance, the first offset distance and the second offset distance being unequal.

In another aspect, the first manifold of the second heat exchanger slab defines an inlet header for receiving the fluid to be cooled and distributing the fluid to be cooled amongst the tubes of the tube bank of the second heat exchanger slab, the second manifold of the second heat exchanger slab defines an intermediate header for receiving the fluid to be cooled from the tubes of the second tube bank, the second manifold of the first heat exchanger slab defines an intermediate header and an intermediate header for receiving the fluid to be cooled from the second manifold of the second heat exchanger slab and distributing the fluid to be cooled to a first number of the tubes of the first tube bank and a separate outlet header for receiving the fluid to be cooled from a second number of the tubes of the first tube bank, and the first manifold of the first heat exchanger slab defines an intermediate header for receiving the fluid to be cooled from the first number of the tubes of the first tube bank and for distributing the fluid to be cooled amongst the second number of the tubes of the first tube bank. The first manifold of the second heat exchanger slab defines an interior volume having a first cross-sectional area, the second manifold of the second heat exchanger slab defines an interior volume having a second cross-sectional area, the second manifold of the first heat exchanger slab defines an interior volume having a third cross-sectional area, and the first manifold of the first heat exchanger slab defines an interior volume having a fourth cross-sectional area. The first cross-sectional area has the largest magnitude. In an embodiment, the magnitude of the cross-sectional areas decreases successively from the first cross-sectional area to the fourth cross-sectional area.

In an embodiment, a plurality of flattened tube segments of the second tube bank collectively define a first flow pass for the fluid to be cooled, a first number of a plurality of flattened tube segments of the first tube bank collectively define a second flow pass for the fluid to be cooled, and a second number of the plurality of flattened tube segments of the first tube bank collectively define a third flow pass for the fluid to be cooled. In an embodiment, the third flow pass is disposed above the second flow pass within the first tube bank, and the second manifold of the first heat exchanger slab defines a lower intermediate header and an upper outlet header, with the lower intermediate header in flow communication with the second flow pass and the upper outlet header in flow communication with the third flow pass. The third first fluid flow pass is positioned on top of the second first fluid flow path such that the first fluid flows in an overall vertically upward direction first through the second fluid flow pass and then through the third first fluid flow pass.

In an embodiment where the fluid to be cooled is a refrigerant and the cooling fluid is air, the first refrigerant flow pass comprises a refrigerant desuperheating and condensing pass; the second refrigerant flow pass comprises a refrigerant condensing pass, and the third refrigerant flow pass comprises a refrigerant condensing and subcooling pass. In a configuration of this embodiment, a ratio of the first number of flattened tube segments defining the second refrigerant flow pass to the second number of flattened tube segments defining the third refrigerant flow pass ranges from a 70%/30% split to a 80%/20% split.

In a further aspect, a method is provided for assembling a flattened tube finned heat exchanger having a first tube bank and a second tube bank. The method includes the steps of: assembling a first plurality of flattened heat exchange tube segments in parallel spaced relationship with a continuous folded fin disposed between each pair of parallel flattened heat exchange tube segments to form a partially assembled fin and tube pack; providing a first spacer strip and a second spacer strip, each of the first and second spacer strips having a desired depth that equals a desired value that is the same for both the first and second spacer strips; positioning the first spacer on a first side of the partially assembled fin and tube pack and a the second spacer on a second side of the partially assembled fin and tube pack, each spacer strip extending transversely across a leading edge of each of the flattened tube segments; inserting a second plurality of flattened heat exchange tubes into the partially assembled fin and tube pack such that a trailing edge of each of inserted tube aligns with a leading edge of a respective one of the first plurality of flattened heat exchange tubes and abuts both the first spacer strip and the second spacer strip to form an assembled fin and tube pack; compressing the assembled fin and tube pack between end braze bars; mounting a first manifold to the respective first ends of each of the first plurality of flattened heat exchange tubes, mounting a second manifold to the respective second ends of the first plurality of flattened heat exchange tubes, mounting a third manifold to the respective first ends of each of the second plurality of flattened heat exchange tubes, and mounting a fourth manifold to the respective second ends of the second plurality of flattened heat exchange tubes, thereby forming a final assembly; removing the first and second spacer strips from the final assembly; and bonding the final assembly by brazing in a brazing furnace.

BRIEF DESCRIPTION OF THE DRAWINGS

For a further understanding of the disclosure, reference will be made to the following detailed description which is to be read in connection with the accompanying drawings, where:

FIG. 5 is a top plan view of the heat exchanger of FIG. 1;

FIG. 6 is a plan view, partly in section, illustrating the connection between the heat exchange tubes and the respective manifolds of the heat exchanger of FIG. 1;

FIG. 8 is an exploded view of a two piece embodiment of the manifolds at the refrigerant outlet side of the heat exchanger of FIG. 1;

FIG. 9 is a cross-section view of a single piece embodiment of the manifolds at the refrigerant outlet side of the heat exchanger of FIG. 1;

FIG. 11A is a cross-section of another embodiment of the manifolds at the refrigerant outlet side of the heat exchanger of FIG. 1;

DETAILED DESCRIPTION

Figure 1:
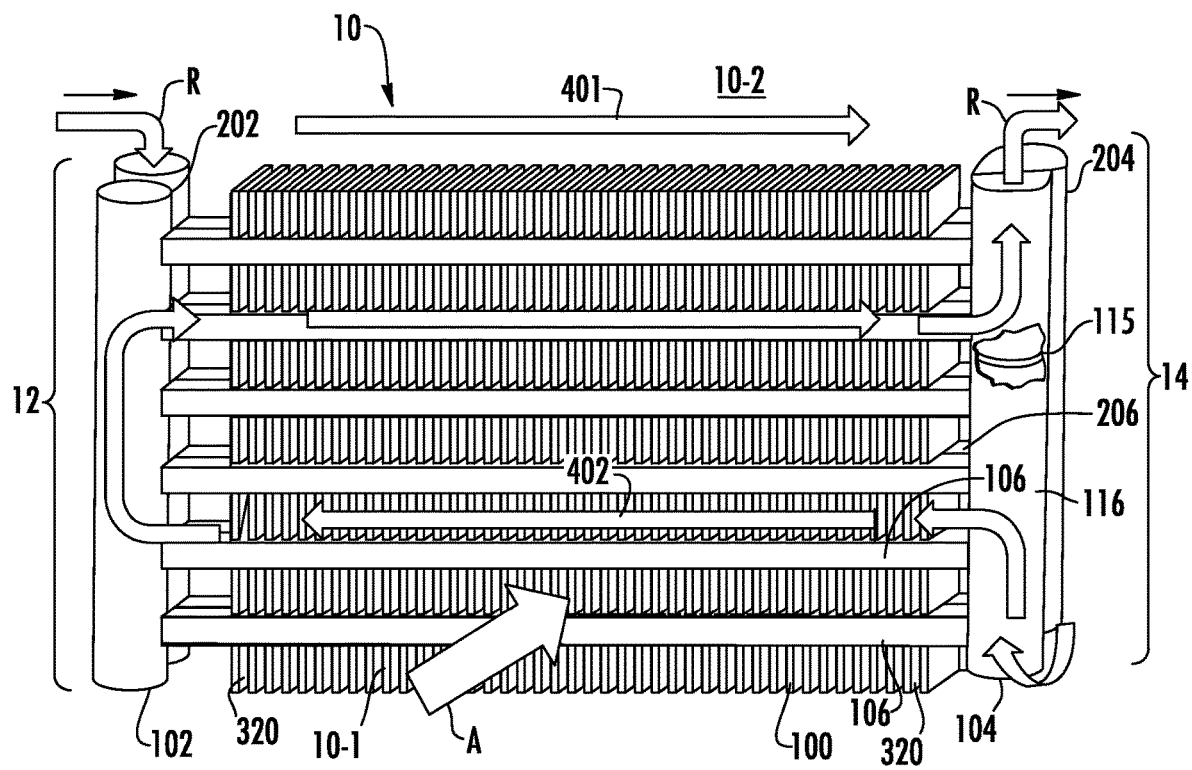
FIG. 1 is a diagrammatic illustration of an exemplary embodiment of a multiple tube bank, flattened tube finned heat exchanger as disclosed herein.
Figure 2:
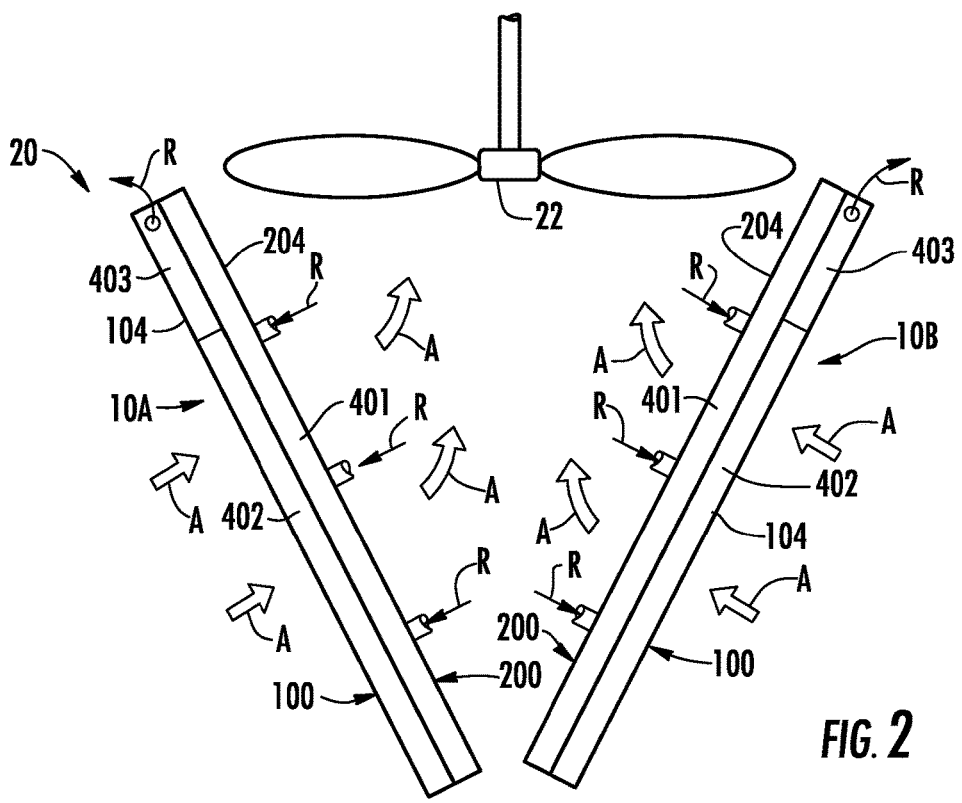
FIG. 2 side elevation view of an exemplary arrangement of a refrigerant condenser incorporating of pair of multiple tube bank, flattened tube finned heat exchanger as disclosed herein.

There is depicted in FIG. 1 in perspective illustration an exemplary embodiment of a multiple bank flattened tube finned heat exchanger 10 in accordance with the disclosure. In FIG. 2 an exemplary embodiment of a refrigerant condenser 20 that includes a pair of multiple bank flatten tube finned heat exchangers 10A, 10B, disposed in a generally V-shaped arrangement, and an associated air moving device, for example condenser fan 22 for drawing a flow of a cooling media, for example ambient air, A, through the heat exchangers 10A, 10B, in heat exchange relationship with a flow of refrigerant, R, passing through the flattened tube segments of the heat exchangers 10A, 10B. The lower end of each heat exchanger 10A, 10B is disposed at the bottom of the V-shaped arrangement and the upper end of each heat exchanger 10A, 10B is disposed at top of the V-shaped arrangement. As depicted therein, the multiple bank flattened tube finned heat exchanger 10 includes a first heat exchanger slab 10-1 and a second heat exchanger slab 10-2 that is disposed behind the first tube bank 100, that is downstream with respect to air flow, A, through the heat exchanger 10. It has to be noted that the V-configuration is purely exemplary, and other arrangements are permissible and within the scope of the invention.

Referring now to FIG. 1, the first heat exchanger slab 10-1 includes a first manifold 102 extending along a vertical axis, a second manifold 104 extending along a vertical axis and spaced apart from the first manifold 102, and a first tube bank 100 connecting the first manifold 102 and the second manifold 104 in fluid communication and including a plurality of heat exchange tube segments 106, including at least a first and a second tube segment. In the depicted embodiment, the plurality of heat exchange tube segments 106 extend longitudinally in spaced parallel relationship between and connect the first manifold 102 and the second manifold 104 in fluid communication. Similarly, the second heat exchanger slab 10-2 includes a first manifold 202 extending along a vertical axis, a second manifold 204 also extending along a vertical axis and spaced apart from the first manifold 202, and a second tube bank 200 connecting the first manifold 202 and the second manifold 204 in fluid communication and including a plurality of heat exchange tube segments 206, including at least a first and a second tube segment. In the depicted embodiment, the plurality of heat exchange tube segments 206 extend longitudinally in spaced parallel relationship between and connect the first manifold 202 and the second manifold 204 in fluid communication. It is to be understood, however, that one or both of the tube banks 100 and 200 may comprise one or more serpentine tubes having a plurality of heat exchange tube segments extending in longitudinally spaced parallel relationship and interconnected by return bends to form a serpentine tube connected at its respective ends between the respective first and second manifolds of the tube banks. As will be discussed in detail later herein, the first and second heat exchanger slabs 10-1, 10-2 are juxtaposed in generally adjacent relationship with the first manifold 102 of the first heat exchanger slab 10-1 and the first manifold 202 of the second heat exchanger slab 10-2 disposed at the refrigerant inlet side 12 of the heat exchanger 10 and with the second manifold 104 of the first heat exchanger slab 10-1 and the second manifold 204 of the second heat exchanger slab 10-2 disposed at the refrigerant outlet side 14 of the heat exchanger 10. It has to be noted that although a dual slab heat exchanger construction is depicted in FIG. 1, the design can be extended to multiple slabs with no limitation, primarily dictated by economics and available footprint.

Figure 3:
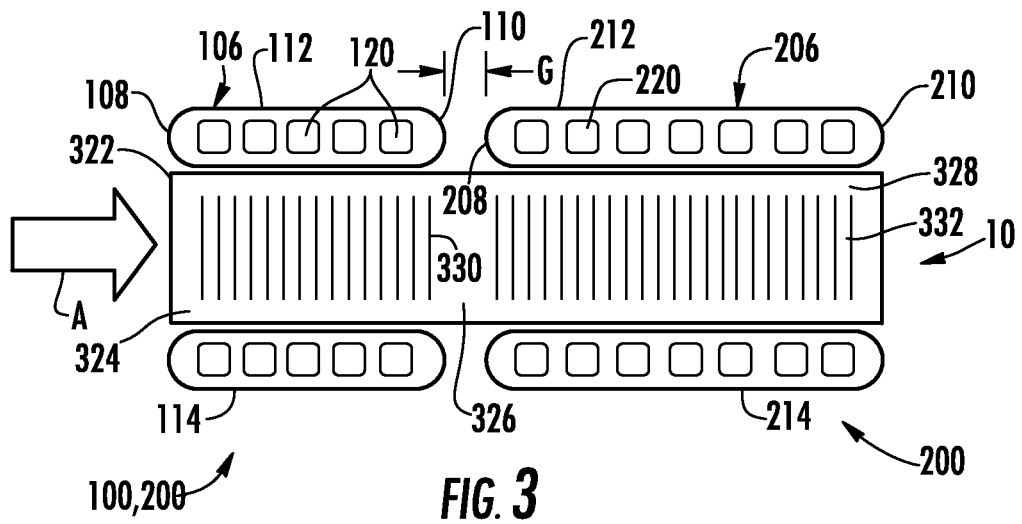
FIG. 3 is a side elevation view, partly in section, illustrating an embodiment of a fin and flattened tube assembly of the heat exchanger of FIG. 1.
Figure 4:
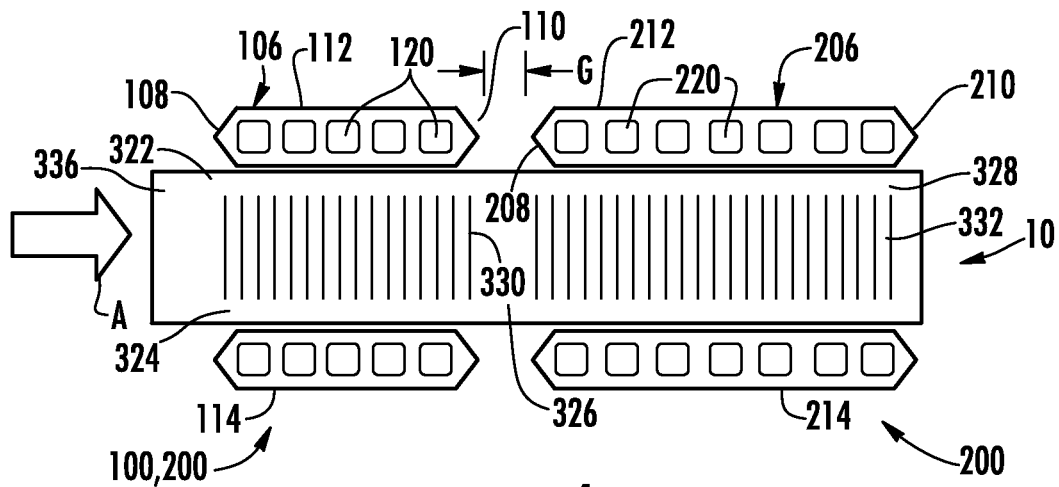
FIG. 4 is a side elevation view, partly in section, illustrating another embodiment of a fin and flattened tube assembly of the heat exchanger of FIG. 1.

Referring now to FIGS. 3-4, in the depicted embodiment, each of the heat exchange tube segments 106, 206 comprises a flattened heat exchange tube having a leading edge 108, 208, a trailing edge 110, 210, an upper flat surface 112, 212, and a lower flat surface 114, 214. The leading edge 108, 208 of each heat exchange tube segment 106, 206 is upstream of its respective trailing edge 110, 210 with respect to air flow through the heat exchanger 10. In the embodiment depicted in FIG. 3, the respective leading and trailing portions of the flattened tube segments 106, 206 are rounded thereby providing blunt leading edges 108, 208 and trailing edges 110, 210. In the embodiment depicted in FIG. 4, however, the respective leading and trailing portions of the flattened tube segments 106, 206 are tapered to provide knife edge like leading edges 108, 208 and trailing edges 110, 210.

The interior flow passage of each of the heat exchange tube segments 106, 206 of the first and second tube banks 100, 200, respectively, may be divided by interior walls into a plurality of discrete flow channels 120, 220 that extend longitudinally the length of the tube from an inlet end of the tube to the outlet end of the tube and establish fluid communication between the respective headers of the first and the second tube banks 100, 200. In the embodiment of the multi-channel heat exchange tube segments 106, 206 depicted in FIGS. 3 and 4, the heat exchange tube segments 206 of the second tube bank 200 may have a greater width than the heat exchange tube segments 106 of the first tube bank 100. Also, the interior flow passages of the wider heat exchange tube segments 206 is divided into a greater number of discrete flow channels 220 than the number of discrete flow channels 120 into which the interior flow passages of the heat exchange tube segments 106 are divided.

The second tube bank 200 of the second (rear) heat exchanger slab 10-2, is disposed behind the first tube bank 100 of the first (front) heat exchanger slab 10-1, with respect to the flow of air, A, through the heat exchanger 10, with each heat exchange tube segment 106 directly aligned with a respective heat exchange tube segment 206 and with the leading edges 208 of the heat exchange tube segments 206 of the second tube bank 200 spaced from the trailing edges 110 of the heat exchange tube segments of the first tube bank 100 by a desired spacing, G. In the embodiment depicted in FIG. 3, the desired spacing, G, is established by an open gap, thereby providing an open water/condensate drainage space between the trailing edge 110 and the leading edge 208 of each set of aligned heat exchange tube segments 106, 206 along the entire length of the heat exchange tube segments 106, 206. The ratio of the flattened tube segment depth and gap G is defined by thermal and drainage characteristics and positioned between 1.2 and 6.0, with the optimum residing between 1.5 and 3.0.

The flattened tube finned heat exchanger 10 disclosed herein further includes a plurality of folded fins 320. Each folded fin 320 is formed of a single continuous strip of fin material tightly folded in a ribbon-like fashion thereby providing a plurality of closely spaced fins 322 that extend generally orthogonal to the flattened heat exchange tubes 106, 206. Typically, the fin density of the closely spaced fins 322 of each continuous folded fin 320 may be about 18 to 25 fins per inch, but higher or lower fin densities may also be used. The depth of each of the ribbon-like folded fin 320 extends at least from the leading edge 108 of the first tube bank 100 to the trailing edge of 210 of the second bank 200 as illustrated in FIG. 3. Thus, when a folded fin 320 is installed between a set of adjacent heat exchange tube segments in the assembled heat exchanger 10, a first section 324 of each fin 322 is disposed within the first tube bank 100, a second section 326 of each fin 322 spans the spacing, G, between the trailing edge 110 of the first tube bank 100 and the leading edge 208 of the second tube bank 200, and a third section 328 of each fin 322 is disposed within the second tube bank 200. In an embodiment, each fin 322 of the folded fin 320 may be provided with louvers 330, 332 formed in the first and third sections, respectively, of each fin 322. In an embodiment of the flattened tube finned heat exchanger 10, with respect to the first tube bank 100, the leading portion 336 of each folded fin 320 extends upstream with respect to air flow through air side pass of the heat exchanger 10 so as to overhang the leading edges 108 of the flattened tube segments 106 of the first tube bank 100, for example as illustrated in FIG. 4. The louver count and louver geometry may be different within each section of the fins 322 and may be related to the respective flattened tube depth. The ratio of the flattened tube segment depth (leading edge to trailing edge) to fin depth (leading edge to trailing) is defined by thermal and drainage characteristics and in an embodiment is positioned between 0.30 and 0.65, inclusive, and in another embodiment resides between 0.34 and 0.53, inclusive. Similarly, the ratio of the fin overhang to the flattened tube segment depth is defined by thermal and drainage characteristics and ranges between 0 and 0.5, inclusive, and in an embodiment is between 0.13 and 0.33, inclusive.

Heat exchange between the refrigerant flow, R, and air flow, A, occurs through the outer surfaces 112, 114 and 212, 214, respectively, of the heat exchange tube segments 106, 206, collectively forming the primary heat exchange surface, and also through the heat exchange surface of the fins 322 of the folded fin 320, which forms the secondary heat exchange surface. In the multiple bank, flattened tube finned heat exchanger 10 disclosed herein, because the fins 322 of the folded fin 320 span the spacing, G, the ratio of the surface area of the primary heat exchange surface to the surface area provided by the secondary heat exchange surface may be selectively adjusted without changing the width of the tube segments or the spacing between parallel tube segments. Rather during the design process, the depth of the spacing, G, may be increased to increase the surface area provided by the folded fin 320, thereby decreasing the ratio of primary to secondary heat exchange surface, or may be decreased to decrease the surface area provided by the folded fin plate 320, thereby increasing the ratio of primary to secondary heat exchange surface. The ratio of primary heat exchange surface to secondary heat exchange surface may also be decreased by increasing the overall fin depth by increasing the distance by which the leading portion 336 of the folded fin 320 extends upstream with respect to air flow, A, beyond the face of the heat exchanger 10 and/or by reducing the number of flatted tube rows forming the tube banks of both the heat exchanger slabs.

Figure 11B:
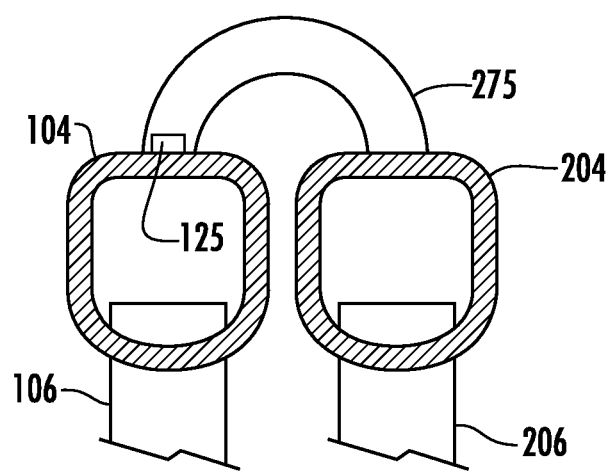
FIG. 11B is a cross-section of another embodiment of the manifolds at the refrigerant outlet side of the heat exchanger of FIG. 1.

In the embodiment depicted in FIGS. 5 and 6, the neighboring manifolds 102 and 202 at the refrigerant inlet side of the heat exchanger 10 are separate manifolds ends of the tube banks 100, 200 may be separate manifolds that are maintained in spaced relationship by a spacer 130. In the embodiment depicted in FIG. 7, however, the first manifold 102 of the first heat exchanger slab 10-1 and the first manifold 202 of the second heat exchanger slab 10-2 are formed, for instance extruded and machined, as a single piece assembly. At the refrigerant outlet side 14 of the heat exchanger 10, the neighboring manifolds 104, 204 may be combined, for example brazed together in side-by-side relationship, such as depicted in FIGS. 6 and 8, or integrated into a single piece construction, such as depicted in FIG. 9, that is subdivided by a common interface wall 250 into separate manifolds 104, 204 that are fluidly interconnected internally within the single piece construction to accommodate the particular refrigerant circuitry incorporated into the heat exchanger 10. In an embodiment, the neighboring manifolds 104, 204 at the refrigerant outlet side of the heat exchanger 10 may be separate manifolds connected in refrigerant flow communication by flow passage 125 defined by at least one flow channel 265 interconnecting the manifolds 104, 204, such as depicted in FIG. 11A or by flow passage 125 defined by a least one return bend tube 275 interconnecting the manifolds 104, 204, such as depicted in FIG. 11B. It has to be noted that the cross-sectional shape of the flow passage 125 can have different configurations such as linear, circular arch-like, elliptical arc-like, etc. Further, the ratio of the overall collective cross-sectional area of the flow passages 125 to the cross-section area of the manifold may be between 0.25 and 2.5, inclusive. In an embodiment, ratio of the overall collective cross-sectional area of the flow passages to the cross-sectional area of the manifold is between 1.0 and 1.5, inclusive.

Referring now again to FIG. 1, the multiple tube bank flattened tube finned heat exchanger 10 will be described as configured as a refrigerant condenser heat exchanger in a refrigerant vapor compression system of an air conditioning unit, transport refrigeration unit or commercial refrigeration unit, for example, such as but not limited to, the refrigerant condenser 20 depicted in FIG. 2. In such applications, refrigerant vapor (labeled "R") from the compressor (not shown) of the refrigerant vapor compression system (not shown) passes through the manifolds and heat exchange tube segments of the tube banks 100, 200 of the first and second heat exchanger slabs 10-1, 10-2, in a manner to be described in further detail hereinafter, in heat exchange relationship with a cooling media, most commonly ambient air, flowing through the airside of the heat exchanger 10 in the direction indicated by the arrow labeled "A" that passes over the outside surfaces of the heat exchange tube segments 106, 206, commonly referred to as the primary heat exchange surface, and the surfaces of the corrugated fins 320, commonly referred to as the secondary heat exchange surface.

The multiple tube bank flattened tube finned heat exchanger 10 depicted in FIG. 1 has a cross-counterflow circuit arrangement. The air flow first passes transversely across the upper and lower horizontal surfaces 112, 114 of the heat exchange tube segments 106 of the first tube bank, and then passes transversely across the upper and lower horizontal surfaces 212, 214 of the heat exchange tube segments 206 of the second tube bank 200. The refrigerant passes in cross-counterflow arrangement to the airflow, in that the refrigerant flow passes first through the second tube bank 200 and then through the first tube bank 100. In the process, the refrigerant passing through the flow channels of the heat exchange tubes 106, 206 rejects heat into the airflow passing through the air side of the heat exchanger 10. The multiple tube bank flattened tube finned heat exchanger 10 having a cross-counterflow circuit arrangement yields superior thermal performance, as compared to the pure crossflow or cross-parallel flow circuit arrangements. As stated above, the invention is not limited to the dual slab configurations and can be readily extended to arrangements with more the two slabs.

More specifically, in the embodiment depicted in FIG. 1, the refrigerant flow, designated by the label "R", passes from the refrigerant circuit (not shown) into the first manifold 202 of the second heat exchanger slab 10-2, via refrigerant inlets 222 (FIG. 6), and is distributed amongst all the heat exchange tube segments 206 of the second tube bank 200, collectively forming a first refrigerant pass 401 through the heat exchanger 10, to flow therethrough into the second manifold 204 of the second heat exchanger slab 10-2. The refrigerant collecting in the second manifold 204 of the second heat exchanger slab 10-2 then passes internally into a lower section 116 of the second manifold 104 of the first heat exchanger slab 10-1 and is distributed amongst a first portion of the heat exchange tube segments 106 of the first tube bank 100. A flow impervious baffle 115 is disposed across the interior volume of the second manifold 104 of the first heat exchanger slab 10-1 so as to divide the interior volume into a lower volume in lower section 116 of the second manifold 104 and an upper volume in upper section 118 of the second manifold 104. The refrigerant passes from the lower section 116 of the second manifold 104 through the first portion of the flattened tube segments 106 collectively forming a second refrigerant pass 402 through a lower portion of the first tube bank 100 and into the first manifold 102 of the first heat exchanger slab 10-1. From the first manifold 102 the refrigerant is distributed amongst a second portion of the heat exchange tube segments 106 of the first tube bank 100, collectively forming a third refrigerant pass 403 through the heat exchanger 10 through an upper region of the first tube bank 100, to flow therethrough into the upper portion 118 of the second manifold 104 of the first tube bank 100. The refrigerant passes from the second manifold 104 of the first tube bank 100 through refrigerant outlet 122 (FIG. 6) back into the refrigerant circuit of the refrigerant vapor compression system (not shown).

The flow impervious baffle plate 115 is disposed across the interior volume of the second manifold 104 to divide the interior volume of the second manifold 104 into the lower portion 116 that serves as an intermediate header and the upper portion 118 that serves as an outlet header. During manufacture of the second manifold 104 of the first heat exchanger slab 10-1, the baffle plate 115 may be positioned as desired within the interior volume of the second manifold 104 to select a desired split with respect to the number of heat exchange tube segment 106 forming the second refrigerant pass 402 and the number of heat exchange tube segments 106 forming the third refrigerant pass 403.

In a refrigerant condenser application, the baffle plate 115 can be selectively positioned such that the split between the number of heat exchange tubes 106 within the second refrigerant pass and the number of heat exchange tubes 106 within the third refrigerant pass is in the range from a 70%/30% split to an 80%/20% split. Thus, the split in number of heat exchange tube segments between the second refrigerant pass and the third refrigerant pass may be selected to control refrigerant pressure drop through the heat exchanger and/or to reduce refrigerant maldistribution amongst the heat exchange tube segments. Additionally, the respective interior volumes of the manifolds 102, 104, 202 and 204 need not be the same, but may vary to compensate for a change in density of the refrigerant flowing through the heat exchanger 10 and/or once again, control refrigerant distribution. In refrigerant condenser applications, for example, the cross-sectional area of the first manifold 202 of the second heat exchanger slab 10-2 on the inlet side 12 of the heat exchange 10, which receives incoming refrigerant vapor from a refrigerant circuit, could have a larger cross-sectional area than the second manifold 204 of the second heat exchanger slab 10-2 on the outlet side 14 of the heat exchanger 10, which receives a cooled and generally partially condensed refrigerant vapor/liquid mixture having traversed the first pass 401 of the heat exchanger 10. The first manifold 202 of the second heat exchanger slab 10-2 could also have a larger cross-sectional area than the first manifold 102 of the first heat exchanger slab 10-1, which is also disposed on the inlet side 12 of the heat exchanger 10, but receives a refrigerant vapor/liquid mixture from the second refrigerant pass 402 which is predominately condensed liquid.

Thus, the refrigerant circuit of the embodiment of the multiple bank heat exchanger hereinbefore described and depicted in FIG. 1 is a single pass, two pass up-flow, cross-counterflow refrigerant circuit. In the refrigerant condenser arrangement as described hereinbefore, the first refrigeration pass 401 functions in part as a desuperheating and condensing pass, the second refrigerant pass 402 as a condensing pass, and the third refrigerant pass 403 as a condensing and subcooling pass. The up-flow circuit arrangement of the second refrigerant pass 402 to the third refrigerant pass 403 ensures the any refrigerant vapor surviving passage through the second refrigerant pass 402 flows upwardly against gravity through a column of refrigerant liquid within the first manifold 102. With this up-flow circuit arrangement, better mixing of refrigerant vapor and liquid flowing through the second refrigerant pass 402 is expected to enhance tube-side heat transfer. Also, the vapor refrigerant is typically exposed to a higher airflow in the flattened tubes of the second pass positioned closer to the air moving device, thus enhancing the condensation process. With the third refrigerant pass 403 in the upper region of the first tube bank 100, the refrigerant subcooling regions of the heat exchangers 10A and 10B are positioned in the upper region of the refrigerant condenser heat exchanger 20 which tends to be even higher air flow region of the heat exchanger 20 as shown in FIG. 2. As the collected water on the surfaces of the heat exchange tube segments 106, 206 and the surfaces of the fins 322 of the continuous folded fins 320 tends to remain longer within the region of the subcooling due to lower temperatures, the higher air flow through the upper region of the heat exchanger 20 will assist in removing the accumulating water on the heat exchange surfaces, as well as the gravity assisted water drainage is expected to dry out the upper portion of the heat exchanger faster, especially during the prolonged unit shutdown periods. It has to be noted that more than a single pass arrangement for the back slab (with respect to the airflow) and more than two pass arrangement for the first slab (with respect to the airflow) are within the scope of the invention, as long as a subcooling pass is located in the upper portion of the heat exchanger.

Figure 7:
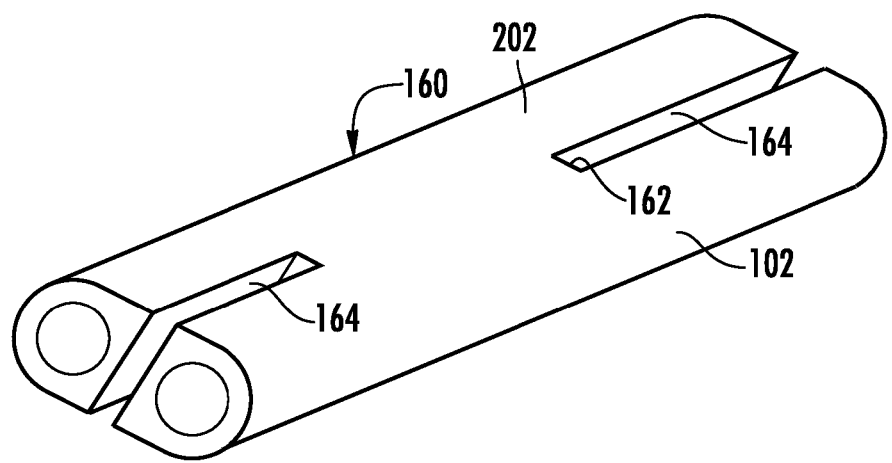
FIG. 7 is a perspective view of an embodiment of an one-piece extruded assembly of the manifolds at the inlet side of the heat exchanger of FIG. 1.

As noted previously, the second tube bank 200, i.e. the rear heat exchanger slab, is disposed behind the first tube bank 100, i.e. the front heat exchanger slab. As best seen in FIGS. 6 and 7, the respective second manifolds 104 and 204 of the heat exchanger 10 are disposed in contact with each other, but the respective first manifolds 102 and 202 of the heat exchanger 10 are disposed in spaced relationship relative to each other. As described previously, in the heat exchanger 10 disclosed herein, the first manifold 202 of the second heat exchanger slab 10-2 defines an inlet header that receives high temperature refrigerant vapor from a refrigerant circuit through at least one refrigerant inlet 222 and distributing the received refrigerant amongst the heat exchange tube segments 206 forming the second tube bank 200; the second manifold 204 of the second heat exchanger slab 10-2 defines an intermediate header for receiving refrigerant having traversed the heat exchange tube segments 206; the second manifold 104 of the first heat exchanger slab 10-1 defines both a lower intermediate header for distributing refrigerant amongst the heat exchange tube segments 106 in a lower portion of the first tube bank 100 and an upper outlet header in fluid communication with the refrigerant circuit through refrigerant outlet 122 for returning subcooled refrigerant liquid to the refrigerant circuit; and the first manifold 102 of the first heat exchanger slab 10-1 defines an intermediate header providing fluid flow communication between the heat exchange tube segments 106 forming the lower pass of the first tube bank 100 and the heat exchange tube segments 106 forming the upper pass of the first tube bank 100. An impervious flow baffle 115 is disposed across the internal volume of the second manifold 104 at a selected location along the longitudinal extent of the second manifold 104, thereby dividing the interior volume defined by the second manifold 104 into the lower intermediate header and the upper outlet header.

With this refrigerant flow arrangement, the temperature differential between the high temperature refrigerant vapor received in the inlet header of the first manifold 202 of the second tube bank 200 and the cooler refrigerant, which may be a mix of liquid and vapor, flowing through the intermediate header of the first manifold 102 of the first tube bank 100 results in uneven thermal expansion with respect to the first manifold 102 and the first manifold 202. Therefore, in the heat exchanger 10 as disclosed herein, provision is made to allow uneven thermal expansion to occur between the neighboring manifolds 102, 202 at the refrigerant inlet side of the heat exchanger 10.

In an embodiment, such as depicted in FIG. 6, at least one spacer 130 is disposed between the first manifold 102 and the first manifold 202 at each end cap of the manifolds and at the center to maintain spacing between the first manifold 102 and the first manifold 202 whereby the only contact between the first manifold 102 and the first manifold 202 is through the spacer 130 which is fixed, for example brazed or welded, to only one of the inlet manifolds 102, 202. On the contrary, the spacer can be removed after final multiple slab heat exchanger assembly or after the brazing process. In the latter case the spacer for instance can be made from steel or other suitable material that does not braze. In an embodiment, the spacer 130 may comprise a generally U-shaped tab, x-shaped tab or an end cap. In an embodiment, the spacer 130 may be an elongated graphite sheet disposed between the first manifold 102 and the first manifold 202. By maintaining a space between the first manifold 102 and the first manifold 202 for minimizing contact therebetween, thermal stress as a result of the aforementioned uneven thermal expansion is avoided and thermal cross conduction from the inlet manifold 202 to the inlet manifold 102 is minimized. Conventional multiple slab heat exchanger constructions, however, characteristically exhibit a higher risk of failure due to thermal fatigue as a result of the uneven thermal expansion. In an embodiment, the space maintained between the manifolds 102 and 202 by the spacer tabs 130 typically ranges from 0.5 to 8 millimeters.

In the embodiment depicted in FIG. 7, however, the first manifold 102 of the first heat exchanger slab 10-1 and the first manifold 202 of the second heat exchanger slab 10-2 are formed together as a single-piece manifold assembly 160. The single piece manifold assembly 160 is fabricated (e.g. extruded) as two elongated generally tubular members disposed is spaced side-by-side relationship with a spacer bar 162 bridging the space between and formed integrally with the manifolds 102, 202. Upon completion of the extrusion process, the manifold assembly 160 is cut to the desired length. At this point, the spacer bar 162 extends the full longitudinal length of the manifold assembly. To allow for uneven thermal expansion without excessive thermal stress a portion 164 of the spacer bar 162 is machined away longitudinally inwardly at both ends of the manifold assembly 160 leaving the respective end portions of each of the first manifold 102, 202 free to expand in a longitudinal and transverse directions differentially from the other first manifold, thereby minimizing the thermal stress and thermal fatigue that would otherwise be experienced as a result of uneven thermal expansion.

Referring again to FIG. 6, the spaced manifolds 102, 202 at the refrigerant inlet side 12 of the heat exchanger 10 are not aligned with the mated manifolds 104, 204 at the refrigerant outlet side 14 of the heat exchanger 10. In the multiple bank flattened tube finned heat exchanger disclosed herein, the slots provided in each of the manifolds 102, 202, 104, 204 for receiving the ends of the heat exchange tube segments 106, 206 are not centered on the centerlines of the manifolds as in conventional flattened tube heat exchangers. Rather, as illustrated in FIG. 6, the slots are offset from the centerlines of respective manifolds 102, 202, 104, 204 by an amount necessary to ensure that the heat exchange tube segments 106 of the first tube bank 100 and the heat exchange tube segments 206 are parallel to each other.

In the embodiment depicted in FIG. 6, the manifolds 202 and 204 are only slightly offset from each other and the centerline of the tube segment 206. However, the manifolds 102 and 104 of the first heat exchanger slab 10-1 are well offset from the centerline 405 of the flattened tube segment 106. The centerline 407 of the first manifold 102 is offset from the centerline 405 of the flattened tube segment 106 by a first offset distance 406, which provides a first clearance 408 between the trailing edge 110 and the inside wall of the first manifold 102. However, the centerline 409 of the second manifold 104 is offset from the centerline 405 of the flatted tube segment 106 by a second offset distance 410, which provides a second clearance 412 between the trailing edge of the tube segment 106 and the inside wall of the second manifold 104. As illustrated in FIG. 7, the first and second offset distances 406, 410 are not equal and the first and second clearances are not equal. Rather, the first offset distance 406 is greater than the second offset distance 410 and the first clearance 408 is smaller than the second clearance 412. For both of the first and second clearances 406, 410, the minimum clearance should be at least 0.75 millimeters.

In the embodiment depicted in FIG. 8, the second manifold 104 of the first heat exchanger slab 10-1 and the second manifold 204 of the second heat exchanger slab 10-2 are disposed in side wall-to-side wall contact along their length. As illustrated in FIG. 8, a plurality of openings 125 are provided at spaced intervals in the side wall of the second manifold 104 that interfaces with the side wall of the second manifold 104. The openings 125, each of which extends through the side wall of the second manifold 104, are confined to the portion of the second manifold 104 that defines the intermediate header 116 of the first tube manifold 100. Similarly, a plurality of openings 225, each of which extends through the side wall of the second manifold 204, are provided at spaced intervals in the lower portion of the side wall of the second manifold 200 that interfaces with the side wall of the first manifold 100. The plurality of openings 125 and the plurality of openings 225 are equal in number and are spaced apart such that each opening 125 lies in registration with a respective one of the openings 225 and thereby define a plurality of flow passages through which refrigerant may flow from the second manifold 204 of the second heat exchanger slab 10-2 (the rear heat exchanger slab) into the intermediate header of the first manifold 104 of the first heat exchanger slab 10-1 (the front heat exchanger slab). Refrigerant flow communication openings 125 can be of circular, oval, racetrack, rectangular or any other suitable shape and should have size and separation to provide adequate cross-section area for refrigerant flow and sufficient structural integrity.

Referring now to FIG. 9, there is depicted in cross-section an embodiment of the heat exchanger 10 wherein the second manifold 104 of the first heat exchanger slab 10-1 and the second manifold 204 of the second heat exchanger slab 10-2 are formed in a single piece construction 250 and share a common interface wall 250. A plurality of flow passage cutouts 255 are provided at spaced intervals in the common interface wall 252. The flow passage cutouts 255 are confined to that portion of the common interface wall 250 that bounds the intermediate header portion of the second manifold 104 of the first tube manifold 100. Like the flow passages formed by the registration of the cutouts 125 and the cutouts 225 of the interfacing side walls of the second manifold 104 and the second manifold 204 in the embodiment depicted in FIG. 8, the flow passage cutouts 255 in the common interface wall 252 of the single piece manifold construction 250 depicted in FIG. 9 define a plurality of flow passages through which refrigerant may flow from the second manifold 204 of the second tube bank 200 (the rear heat exchanger slab) into the intermediate header of the first manifold 104 of the first tube bank 100 (the front heat exchanger slab). In either of the depicted embodiments, the cutouts 125, 225, 255 may have a width in the range of 20% to 50% of the flat platform of the wall in which the cutouts are provided and the cutouts 125, 225, 255 may have collective height in the range of 20% to 80% of the height of the portion of the second manifold 104 that defines the intermediate header 116 of the first tube manifold 100. As mentioned above, the cross-sectional shape of the cutouts 125, 225, 255 can be round, oval, rectangular, square or any other desired configuration.

Figure 10:
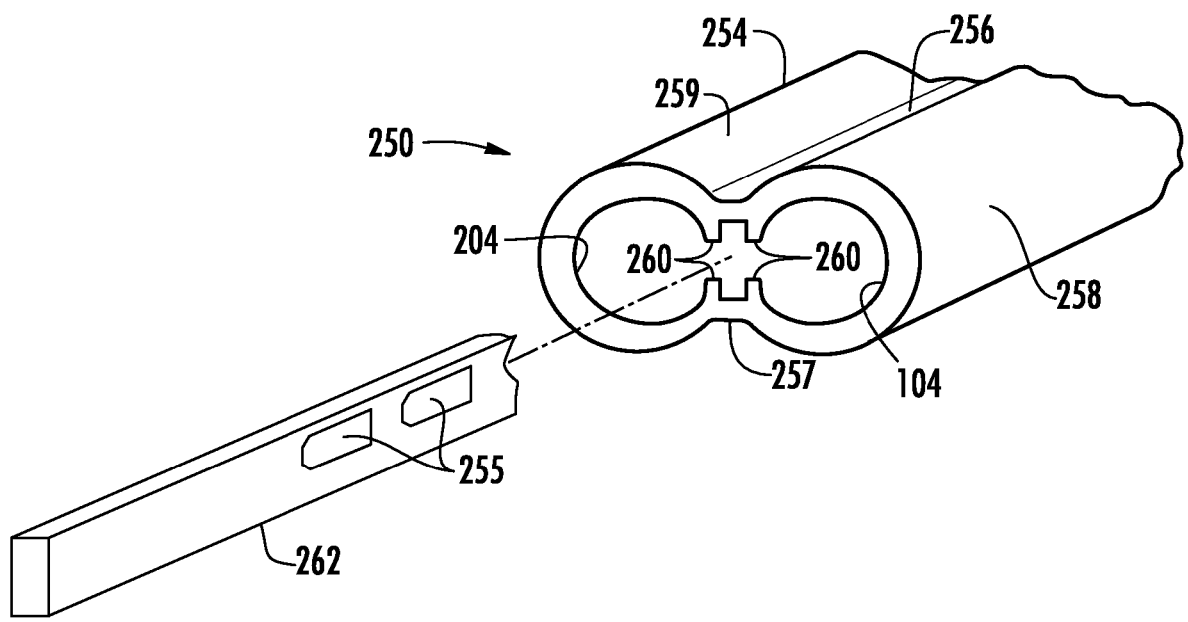
FIG. 10 is an exploded view of another embodiment of the assembly of the manifolds at the refrigerant outlet side of the heat exchanger of FIG. 1.

An exploded view illustrating a method for manufacturing the single-piece manifold construction 250 is depicted in FIG. 10. A longitudinally elongated double barreled tubular member 254 is extruded and cut at a desired length. Spacer webs 256, 257 extend between the top and bottom sides of the longitudinally extending barrels 258, 259, respectively. Each of the spacer webs 256, 257 includes a pair of spaced tabs 260 integrally formed therewith during extrusion or other fabrication and extending inwardly along the entire longitudinal extent of the tubular member 254. A wall insert 262 is extruded, or other fabricated, to have a length equal to the length of the tubular member 254, and a height and width to accommodate a sliding fit of the wall insert 262 into the space defined between the spacer webs 256, 257 and bounded by the tabs 260. To form the center wall 252 dividing the single piece double barreled construction 250 into separate second manifolds 104, 204, the wall insert 262 and the facing surfaces of the spacer webs 256, 257 and tabs 260 are cladded with a brazing compound, the wall insert 262 (that also may be cladded) is slid into the space between the tabs 260 until fully received into the tubular member 254, and the entire assembly is then heated in a brazing furnace. For a tubular member 254 made from aluminum or aluminum alloy, the wall insert 262 would also be made from aluminum or compatible aluminum alloy. To accommodate fluid flow from the second manifold 204 into the second manifold 204, the flow cutouts 255 are machined into a selected portion of the wall insert 262 prior to positioning the wall insert 262 in the tubular member 254. Once again, the shape, number and size of the cutouts 255 are defined by the same considerations as specified above.

Figure 12:
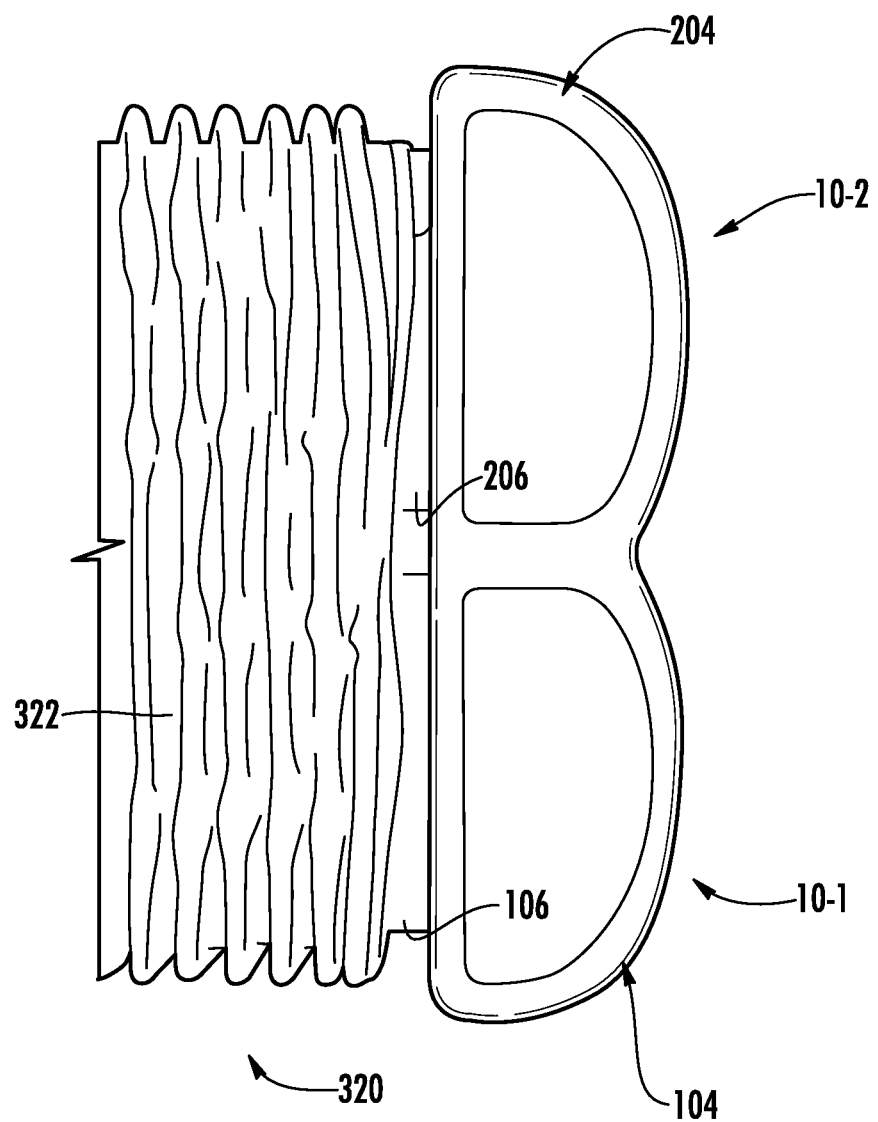
FIG. 12 is a plan view of a fabrication assembly of the heat exchanger of FIG. 1 assembled in accordance with the method of fabricating a multiple bank flattened tube finned heat exchanger as disclosed herein.

In the embodiments of the multiple bank flattened tube finned heat exchanger 10 as disposed herein, the manifolds, heat exchange tubes and fins are all made of aluminum or aluminum alloy material. For an all aluminum heat exchanger design, the entire multiple bank flattened tube finned heat exchanger is assembled and the placed in a brazing furnace wherein the components of the assembled heat exchanger are bonded by brazing. Referring now to FIG. 12, as well as FIGS. 3 and 4, in fabricating the multiple bank flattened tube finned heat exchanger 10, the plurality of tube segments 206 of the second heat exchanger slab 10-2 (the rear heat exchanger slab) are assembled in parallel spaced relationship with a ribbon-like folded fin 20 disposed between each pair of adjacent parallel tube segments 206. As the ribbon-like folded fin 20 has a depth sufficient to extend from the leading edge 108 of the tube segments 106 of the first tube bank 100 of the front heat exchanger slab 10-1 to the trailing edge 210 of the tube segments 206 of the second tube bank 200 of the rear heat exchanger slab 10-2 when the heat exchanger 10 is assembled, a forward portion of each of the folded fins 20 may be designed to extend forwardly beyond the leading edges 208 of the assembled array of tube segments 206.

The exemplary manufacturing processes to fabricate multiple slab flattened tube finned heat exchanger are described below. It has to be understood that these manufacturing processes are provided for illustrative purposes only, and various deviations or alterations of such manufacturing processes may be made without departing from the scope of the method for fabricating a heat exchanger as set forth in the claims. A side spacer strip is positioned against the tube segment 206 outside the folded fin 20 at each end of the assembled array of tube segments 206 and folded fin 20. The side spacer strips extend from the uppermost tube segment to the lowermost tube segment of the assembled array of tube segments 206 transversely across and against the leading edge 208 of each tube segment 206. Each side spacer strip has a depth (thickness) that equals the desired spacing, G, between the trailing edge 110 of the tube segments 106 and the leading edge 208 of the tube segments 210.

With the side spacer strips so positioned, a tube segment 106 is inserted into each of the respective spaces between the forwardly extending portions of the folded fin 20 with the trailing edge 110 of each tube segment 106 abutting against the side spacer strips at each end of the tube segment. In this manner, each tube segment 106 is assembled in alignment with a respective one of the tube segments 206. Then assembled folded fin and tube matrix so assembled is next compressed between end braze bars and held together by dedicated fixture clips.

The four manifolds 102, 104, 202 and 204 are now mounted on the tube segments 106, 206. The manifold 102 has a plurality of openings adapted to receive the respective ends of the tube segments 106 at an end thereof at the refrigerant inlet side of the heat exchanger 10 and the manifold 104 has a plurality of openings adapted to receive the respective ends of the tube segments 106 at the other end thereof at the refrigerant outlet side of the heat exchanger 10. Similarly, the manifold 202 has a plurality of openings adapted to receive the respective ends of the tube segments 206 at an end thereof at the refrigerant inlet side of the heat exchanger 10 and the manifold 204 has a plurality of openings adapted to receive the respective ends of the tube segments 206 at the other end thereof at the refrigerant outlet side of the heat exchanger 10. The manifolds 104 and 204 are now welded together, side wall to side wall with the respective openings 125 and 225 in registration, for example by tack welding.

As noted previously, the manifolds 102 and 202 are not welded together, but rather spaced apart by spacer tabs 130. The desired spacing between the manifolds 102 and 202 is established by tab extensions integral to the respective end caps at each end of the manifolds 102, 202. In an embodiment, the spacer tabs 130 are formed by bending the tab extensions into U-shaped members protruding outwardly from the respective end caps a distance equal to the desired spacing to be maintained between the manifolds 104, 204. The spacer tabs 130 can be coated with a material that prevents brazing of the spacer tabs 130 with the abutting manifold. In an alternate embodiment, instead of providing spacer tabs, the a spacer sheet, such as for example a graphite sheet, having a thickness equal to the desired spacing between the manifolds 102 and 202 and extending substantially the full length of the manifolds may be disposed between the manifolds 102 and 202 to maintain the desired spacing between the manifolds 102 and 202.

With the manifolds 102, 104, 202, 204 assembled to the stacked array of tube segments 106, 206 and folded fin plates 20, the side spacer strips are removed and the entire assembly is placed in a brazing furnace. In the brazing furnace, each of the folded fins 20 is bonded by brazing to the respective tube segments 106, 206 against which it abuts. Simultaneously, the manifolds 102, 104 are bonded by brazing to the tube segments 106 and the manifolds 202, 204 are also bonded by brazing to the tube segments 206.

While the present invention has been particularly shown and described with reference to the exemplary embodiments as illustrated in the drawing, it will be recognized by those skilled in the art that various modifications may be made without departing from the spirit and scope of the invention. For example, it is to be understood that the multiple bank flattened tube finned heat exchanger 10 disclosed herein may include more than two tube banks. It is also to be understood that the tube banks 100, 200 could include serpentine tubes with the heat exchange tube segments 106, 206 being parallel linear tube segments connected by U-bends or hairpin turns to form a serpentine tube connected at its respective ends between the first manifold and the second manifold of the heat exchanger slab. Further, although the multiple tube bank heat exchanger disclosed herein is depicted having flattened tube segments, various aspects of the invention may be applied to multiple bank heat exchangers having round tubes or other forms of non-round tubes. Therefore, it is intended that the present disclosure not be limited to the particular embodiment(s) disclosed as, but that the disclosure will include all embodiments falling within the scope of the appended claims.

We claim:

1. A heat exchanger for transferring heat between a first fluid and a second fluid comprising:
   at least a first heat exchanger slab and a second heat exchanger slab;
   the first heat exchanger slab including a first manifold, a second manifold spaced from the first manifold, and a first tube bank extending between the first manifold and the second manifold and including a plurality of tube segments extending longitudinally in spaced relationship, each tube segment defining an internal flow passage for the first fluid;
   the second heat exchanger slab including a first manifold, a second manifold spaced from the first manifold, and a second tube bank extending between the first manifold and the second manifold and including a plurality of tube segments extending longitudinally in spaced relationship, each tube segment defining an internal flow passage for the first fluid, said second heat exchanger slab being disposed in generally parallel alignment with said first heat exchanger slab, the first manifold of said first heat exchanger slab and the first manifold of said second heat exchanger slab juxtaposed in spaced relationship at a first side of said heat exchanger, and the second manifold of said second heat exchanger slab and the second manifold of said first heat exchanger slab at a second side of said heat exchanger; and a plurality of folded fins disposed in a flow path of the second fluid through said heat exchanger and in operative association with the plurality of tube segments of the first tube bank and the second tube bank, each fold fin having a depth extending at least from a leading edge of the tube segments of the first tube bank to a trailing edge of the tube segments of the second tube bank;

wherein a centerline of the first manifold of said first heat exchanger slab is offset from a centerline of the first tube bank by a first non-zero offset distance and a centerline of the second manifold of said first heat exchanger slab is offset from the centerline of the first tube bank by a second non-zero offset distance, the first non-zero offset distance and the second non-zero offset distance being unequal.

2. The heat exchanger as recited in claim 1 further comprising a spacer disposed between the first manifold of said first heat exchanger slab and the first manifold of said second heat exchanger slab for maintaining a desired spacing between the first manifolds.

3. The heat exchanger as recited in claim 2 wherein the second manifold of the second heat exchanger slab and the second manifold of the first heat exchanger slab are connected in fluid flow communication with respect to the first fluid.

4. The heat exchanger as recited in claim 3 wherein the second manifold of said first heat exchanger slab has at least one flow cutout formed in a side wall thereof and the second manifold of said second heat exchanger slab has at least one flow cutout formed in a side wall thereof, the second manifolds disposed in side-by-side relationship with the at least one flow cutout in the second manifold of said first heat exchanger slab and the at least one flow cutout in the second manifold of said second heat exchanger slab in registration so as to define a flow passageway for the first fluid to flow from the second manifold of said second heat exchanger slab into the second manifold of said first heat exchanger slab.

5. The heat exchanger slab as recited in claim 3 wherein the second manifold of said first heat exchanger slab and the second manifold of said second heat exchanger slab are formed in a single manifold structure on opposite sides of a common interface wall, the common interface wall having at least one flow cutout extending therethrough define a flow passageway for the first fluid to flow from the second manifold of said second heat exchanger slab into the second manifold of said first heat exchanger slab.

6. The heat exchanger slab as recited in claim 3 wherein the second manifold of said first heat exchanger slab and the second manifold of said second heat exchanger slab are formed as separate manifolds and are connected in flow communication by at least one conduit defining a first fluid flow passage.

7. The heat exchanger as recited in claim 1 wherein each of the tube segments of the first tube bank and the second tube banks comprises a flattened tube segment having a depth in the direction of flow of the second fluid through said heat exchanger and a ratio of the flattened tube segment depth of one of the first tube bank and the second tube bank to the depth of said folded fin is in the range between 0.30 and 0.65.

8. The heat exchanger as recited in claim 7 wherein the at least one of said folded fins has a leading edge portion that overhangs the leading edge of the first tube bank by a distance up to 0.5 of the depth of the flattened tube segments of the first tube bank.

9. The heat exchanger as recited in claim 1 wherein at least one of said folded fins has a leading edge portion that overhangs the leading edge of the first tube bank.

10. The heat exchanger as recited in claim 1 wherein said second heat exchanger slab is positioned downstream with respect to flow of the second fluid of said first heat exchanger slab whereby a gap is provided between a trailing edge of the first tube bank and a leading edge of the second tube bank.

11. The heat exchanger as recited in claim 7 wherein said second heat exchanger slab is positioned downstream with respect to flow of the second fluid of said first heat exchanger slab whereby a gap is provided between a trailing edge of the first tube bank and a leading edge of the second tube bank, a ratio of the depth of one of the flattened tube segments to the depth of the gap is in the range between 1.2 and 6.0, inclusive.

12. The heat exchanger as recited in claim 11 wherein the ratio of the depth of one of the flattened tube segments to the depth of the gap is in the range between 1.5 and 3.0, inclusive.

* * * * *